United States Patent [19]
Lee et al.

[11] Patent Number: 5,946,497
[45] Date of Patent: Aug. 31, 1999

[54] SYSTEM AND METHOD FOR PROVIDING MICROPROCESSOR SERIALIZATION USING PROGRAMMABLE FUSES

[75] Inventors: Sherman Lee, Rancho Palos Verdes, Calif.; James R. MacDonald, Buda; Michael T. Wisor, Austin, both of Tex.

[73] Assignee: Advanced Micro Devices, Inc., Sunnyvale, Calif.

[21] Appl. No.: 08/649,538

[22] Filed: May 17, 1996

[51] Int. Cl.⁶ ........................................................ G06F 9/24
[52] U.S. Cl. ................................. 395/800.37; 395/800.32; 395/800.36; 395/183.07; 395/183.2; 395/726
[58] Field of Search ........................... 395/800.01, 800.25, 395/800.26, 800.32, 800.36, 800.37, 183.07, 183.2, 726; 364/DIG. 1

[56] References Cited

U.S. PATENT DOCUMENTS

| | | | |
|---|---|---|---|
| 4,652,990 | 3/1987 | Pailen et al. | 380/4 |
| 4,890,319 | 12/1989 | Seth-Sith et al. | 380/5 |
| 5,029,207 | 7/1991 | Gammie | 380/10 |
| 5,068,889 | 11/1991 | Yamashita | 379/62 |
| 5,068,894 | 11/1991 | Hoppe | 380/23 |
| 5,133,055 | 7/1992 | Lieberman et al. | 395/889 |
| 5,153,918 | 10/1992 | Tuai | 380/10 |
| 5,182,770 | 1/1993 | Medveczky et al. | 380/4 |
| 5,233,613 | 8/1993 | Allen et al. | 371/16.3 |
| 5,237,610 | 8/1993 | Gammie et al. | 380/10 |
| 5,257,166 | 10/1993 | Marui et al. | 361/760 |
| 5,276,738 | 1/1994 | Hirsch | 380/46 |
| 5,467,304 | 11/1995 | Uchida et al. | 365/174 |
| 5,675,825 | 10/1997 | Dreyer et al. | 395/800 |

FOREIGN PATENT DOCUMENTS

| | | |
|---|---|---|
| 2 205 667 | 12/1988 | European Pat. Off. . |
| 0 302 710 | 2/1989 | European Pat. Off. . |
| 0 421 409 | 4/1991 | European Pat. Off. . |
| 0 707 270 | 4/1996 | European Pat. Off. . |

OTHER PUBLICATIONS $AMD5_K86$ *Processor Technical Reference Manual,* 1986 Advanced Micro Devices, Inc., pp. 3–29 through 3–31.

Dallas Semiconductor Corp.: "Section 1: Introduction," Oct. 6, 1993, Data Book Soft Microcontroller, pp. 1–3, 7–8, 73, 77–80, 82, 229, 290–292.

Ferreira, R.C.: "The Smart Card: A High Security tool in EDP," Philips Telecommunication Review, vol. 47, No. 3, Sep. 1, 1989, pp. 1–19.

Electronics, "Designer's Dream Machine", vol. 60, No. 5, Mar. 1987, New York, US, pp. 53–57.

International Search Report for PCT/US 97/05020 dated Aug. 4, 1997.

International Search Report for PCT/US 97/05117 dated Aug. 4, 1997.

International Search Report for PCT/US 97/05019 dated Aug. 4, 1997.

International Search Report for PCT/US 97/05192 dated Apr. 8, 1997.

*Primary Examiner*—Meng-Ai T. An
*Assistant Examiner*—Dzung C Nguyen
*Attorney, Agent, or Firm*—Conley, Rose & Tayon, PC; B. Noel Kivlin

[57] ABSTRACT

A system and method for providing a microprocessor with a software accessible serial number. A plurality of programmable fuses on the processor are encoded with a value representative of a serial number. Circuitry is provided on the processor for transferring the value encoded on the programmable fuses to a machine specific or general purpose register or storage device. The machine specific or general purpose register or storage unit is software accessible.

11 Claims, 3 Drawing Sheets

SYSTEM AND METHOD FOR PROVIDING MICROPROCESSOR SERIALIZATION USING PROGRAMMABLE FUSES

BACKGROUND OF THE INVENTION

1. Field of the Invention

The present invention relates to serialization of microprocessors and, more particularly, to providing a microprocessor serial number on a programmable fuse.

2. Description of the Relevant Art

For some time, workstations, mini-computers, and mainframes have had serial numbers embedded in them which uniquely identify them. Addition of the serial number allows a manufacturer to trace a product in the field back to the original equipment manufacturer (OEM). This allows the manufacturer greater control over its product. In addition, provision of the serial number permits independent software vendors to register their products. By serializing software to a given work station, mini-computer, or mainframe, the independent software vendors can thereby minimize or prevent unauthorized use and/or copying of their products. Microprocessors and personal computers, however, typically have not been tracked by serial number because of the added expense of providing circuitry to store and/or read the serial number. The cost of such circuitry in work stations, mini-computers and mainframes is generally not significant compared to the overall cost of the system and the potential revenue available from serializing the software.

However, as the complexity of microprocessors used in personal computers has increased, it is becoming increasingly cost-effective to provide additional circuitry on the wafer (and corresponding process steps in the manufacture) to provide a serial number. Moreover, as the cost of developing software for personal computers increases, it is increasingly desirable to serialize software to a particular machine, such that when installed on a particular processor the software may read the password or serial number and thereafter be uniquely keyed to that particular processor. An attempt to install the software on a different processor would fail. Accordingly, there is a need for a cost effective and efficient way of providing a unique serial number with a microprocessor in order to trace a product in the field back to an original equipment manufacturer.

As discussed above, it is desirable to serialize software to the microprocessor by means of integrating a serial number into the wafer. One problem, however, with doing so, is that if the processor is upgraded, or otherwise replaced, the software will cease to function since, to the software, there is no difference between being loaded onto an unauthorized computer system and having an unauthorized processor provided to it. In either case, the software will be keyed to a processor that is no longer present and will not function. Accordingly, what is needed is an upgrade method whereby serialized software can detect if it is running on an unauthorized processor and in response thereto, initiate a reauthorization process. If the reauthorization process is successful, the software will function on the upgrade processor. Failure of the reauthorization process, however, will mean that the software itself is loaded on an unauthorized system, and hence, will not function.

SUMMARY OF THE INVENTION

Accordingly, there is provided a novel method of providing a serial number to a microprocessor. The serial number is provided with programmable fuses on the microprocessor die which are laser-trimmed or electronically programmed during the manufacturing process. Circuitry is provided in the microprocessor to allow the serial number provided within the programmable fuses to be stored in machine specific or general purpose registers. The serial number is thus permanent and accessible only to authorized users. The present invention advantageously permits the original equipment manufacturer to trace its products.

Provision of a serial number in accordance with the claimed invention further permits independent software venders to serialize their products. More particularly, software may be serialized to a given processor such that it will not function on an unauthorized processor. A method in accordance with the present invention thus allows the serialization of software to a particular processor. Furthermore, in order to accommodate the growing trend toward upgrading the processor in a computer system, a method is provided whereby software that has been serialized to a particular processor may request reauthorization if it attempted to be installed on an upgrade processor. If the reauthorization attempt fails the software will not be permitted to function on the unauthorized processor.

The present invention may thus advantageously permit independent software vendors to retain the value of their products while allowing original equipment manufacturers an inexpensive, yet effective way, of tracking its products, thereby providing much needed information concerning the real world treatment of its products.

A method for making a microprocessor with a serial number in accordance with one aspect of the present invention includes providing a plurality of programmable fuses on the processor with a serial number. Circuitry is provided on the processor for enabling the value in the programmable fuses to be provided to a machine specific or general purpose register or storage device. The register or storage unit is software accessible.

A method for performing a software lock using the microprocessor serial number in accordance with one aspect of the present invention includes the steps of reading a value indicative of states of a plurality of programmable fuses that form the microprocessor serial number; storing the microprocessor serial number in a software accessible storage unit; reading the software-accessible storage unit for the serial number; and performing a software lock operation to lock the software to the microprocessor serial number.

A method for performing a software lock upgrade in accordance with the present invention includes the steps of storing a value in the programmable fuses in a machine specific or general purpose register of a currently installed microprocessor; retrieving a second serial number of a previously installed microprocessor; comparing the first and second serial numbers; seeking authorization to perform a software lock using the first serial number; and performing the software lock if the authorization is obtained.

BRIEF DESCRIPTION OF THE DRAWINGS

Other objects and advantages of the invention will become apparent upon reading the following detailed description and upon reference to the accompanying drawings in which.

Figure 1:
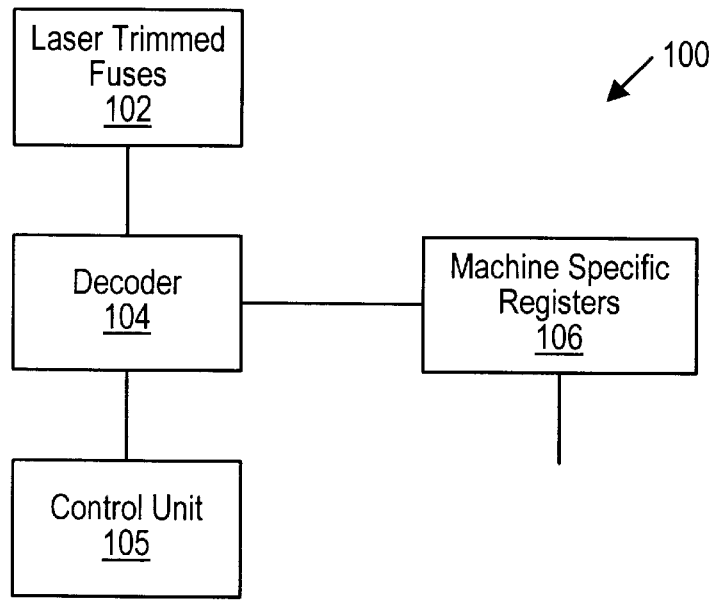
FIG. 1 is a block diagram of a processor employing a serialization mechanism in accordance with the present invention.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternative falling within the spirit and scope of the present invention as defined b the appended claims.

DETAILED DESCRIPTION OF THE INVENTION

Turning now to the drawings, and with particular attention to FIG. 1, there is shown an exemplary processor 100 employing a serialization mechanism including circuitry for programmable fuses 102. It should be noted that processor 100 may be any of a variety of popular processors. Processors compatible with the x86 instruction sets, as well as the PowerPC instruction set are contemplated. Programmable fuses 102 are coupled to a decoder 104, which in turn is coupled to machine specific or general purpose registers or storage units 106. A control unit 105 is further coupled to a decoder 104. A sufficient number of programmable fuses are provided such that each processor can have a unique identification number. Machine specific or general purpose registers or storage units 106 are accessible to system software.

Decoder 104 is configured to enable a value indicative of the states of Programmable fuses 102 to be stored in machine specific or general purpose registers 106 in response to a command from control unit 105. It is noted that control unit 105 may be activated upon system initialization via microcode. The serial number is thereby available to the manufacturer for product tracking or to independent software vendors for software serialization. Software can either access the machine specific or general purpose register directly or via a BIOS or operating system (OS) application programming interface (API).

The laser trimming or the electronic programming process is carried out during fabrication of the central processing unit by burning the appropriate serial number into the wafer. Use of the programmable fuses provide excellent security against unauthorized access in that it would be virtually impossible to alter the serial number because altering the laser-trimmed fuses would extremely difficult and would likely destroy or damage the central processing unit itself.

Figure 2:
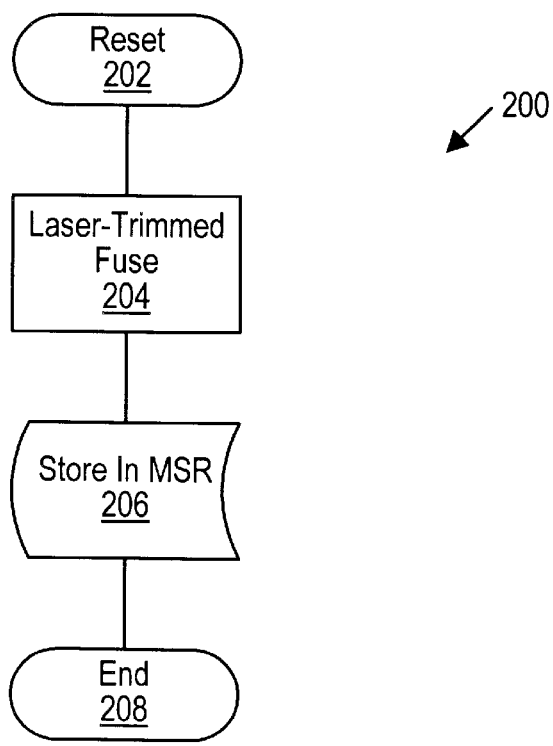
FIG. 2 is a flow-chart illustrating the initial access to a serial number in accordance with the present invention.

FIG. 2 is a flow-chart of the serial number storage process 200 according to one embodiment of the present invention. Upon system reset (step 202), the programmable fuses which were encoded with the processor serial number upon fabrication are accessed (step 204) by decoder 104 responsive to a command from control unit 105. Decoder 104 stores the serial number in the machine specific register or general purpose registers (step 206). The serial number thus is available to system software (step 208) for use in a serialization process or to track the processor for marketing or other reasons.

Figure 3A:
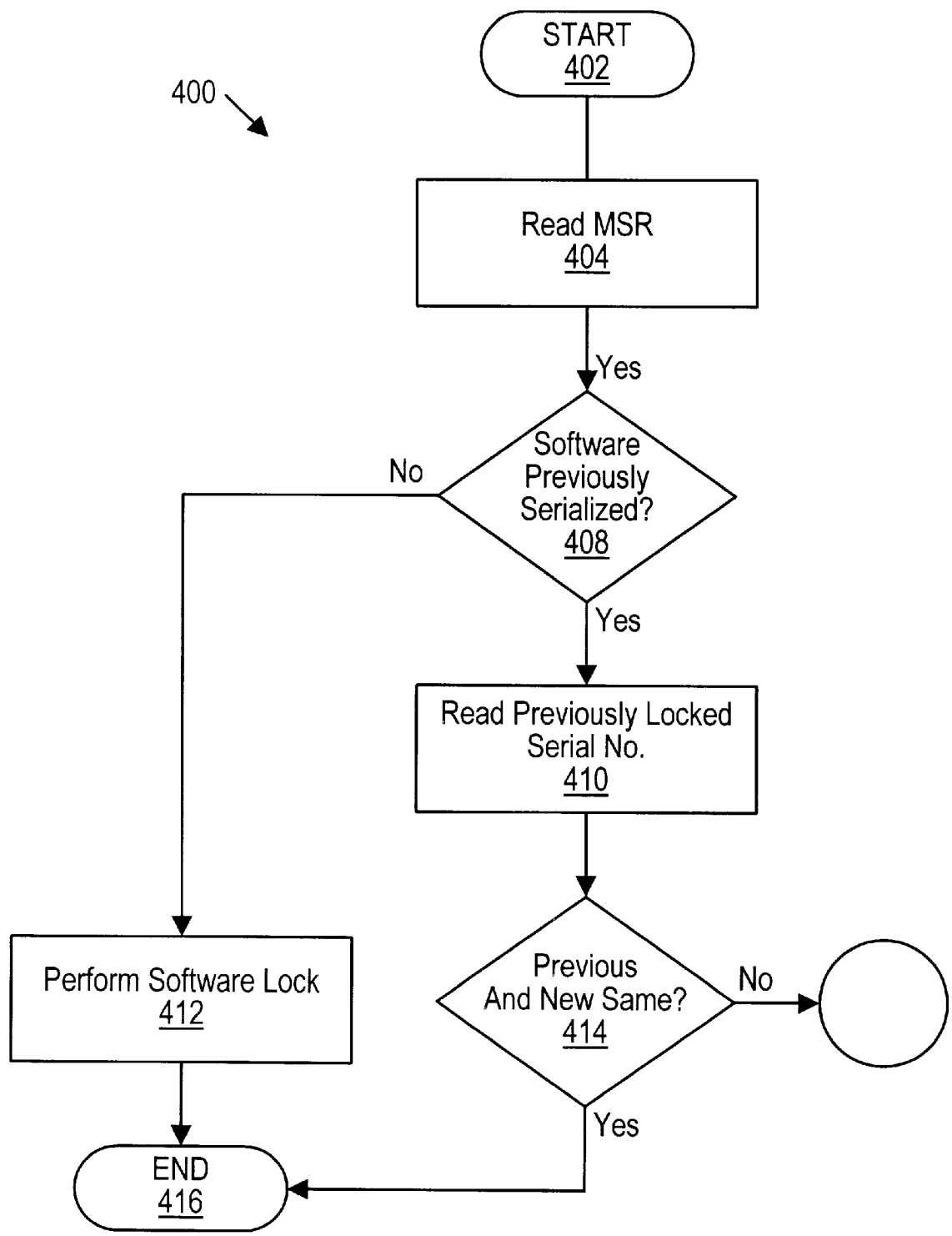
FIGS. 3a and 3b illustrate a software lock and reauthorization process in accordance with the present invention.
Figure 3B:
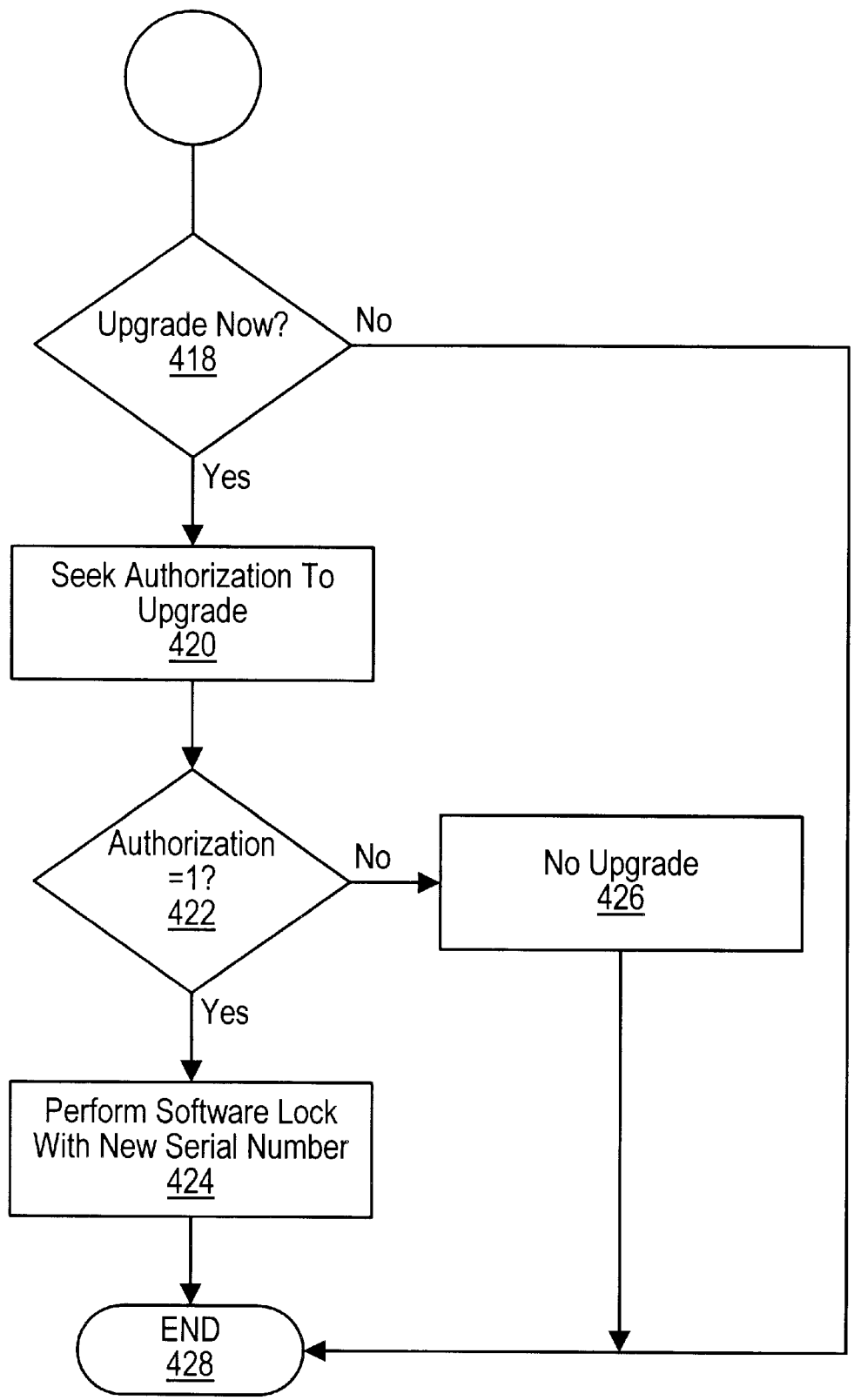

Turning now to FIGS. 3a and 3b there is shown in greater detail a software lock and a request for reauthorization process 400. The process begins at step 402, upon system reset. In step 404 an attempt is made to read the machine specific register or general purpose registers 106. The system must next determine whether or not the software has previously been serialized (step 408), thereby determining whether the software is being newly installed or whether an upgrade is sought. If the software has not been previously been serialized, for example upon initial installation, the (initial) software lock will be performed (step 412) and the process will end (step 416). If in step 408 the software had been previously serialized, the previously locked serial number will be read (step 410). The previously locked serial number within the program (i.e., on the original installation medium and/or on the hard drive) and is available either upon re-installation or running the program. The previously locked serial number and the new serial number are compared in step 414. If the previously locked serial number and the new serial number are the same, the software lock need not be performed, and the process ends. If the previous serial number and the new serial number are not the same, however, in step 418, it is inquired whether or not a lock upgrade is desired to be performed. If no upgrade of the software lock is to be performed, the process ends with the software being locked out. However, if an upgrade is desired, in step 420, authorization for the upgrade will be sought. Authorization may be obtained by connection through a modem or digital network interface to an Internet or other remote access link. Once logged on, authorization will be granted upon checking and passing a use profile; the profile will have been initiated through some form of registration upon purchase or initial installation of the software. If authorization is not granted (step 422) then no upgrade of the software lock will be permitted (step 426) and the process will end. However, if authorization is permitted, a new software lock with a new serial number (step 424) will be performed.

Numerous variations and modifications will become apparent to those skilled in the art once the above disclosure is fully appreciated. It is intended that the following claims be interpreted to embrace all such variations and modifications.

What is claimed is:

1. A method for performing a software lock, comprising:
   reading a first serial number from a plurality of programmable fuses configured in a currently installed microprocessor;
   storing said first serial number in a software readable memory unit;
   reading said first serial number from said software readable memory unit;
   retrieving a second serial number of a previously installed microprocessor;
   comparing said first serial number and said second serial number;
   seeking authorization to perform said software lock with said first serial number in response to said first serial number and said second serial number not matching; and
   performing said software lock with said first serial number if said authorization is obtained.

2. The method of claim 1, wherein said seeking step includes accessing an authorization use profile.

3. The method of claim 1, wherein said software readable storage unit is a machine specific register.

4. The method of claim 1, wherein said software readable storage unit is a general purpose register.

5. The method of claim 1, wherein said programmable fuses are laser trimmed fuses.

6. The method of claim 1, wherein said programmable fuses are electronically programmed fuses.

7. The method of claim 2, wherein said seeking step includes establishing a connection to an authorizing agent through the Internet.

8. A system for performing a software lock, comprising:

means for storing a first serial number in programmable fuses configured within a currently installed microprocessor;

means for reading said first serial number;

means coupled to said reading means for retrieving a second serial number of a previously installed microprocessor;

means coupled to said reading means and said retrieving means for comparing said first serial number and said second serial number;

means responsive to said comparing means for seeking authorization to perform said software lock with said first serial number in response to said comparing means determining that said first serial number and said second serial number do not match; and means responsive to said seeking means for performing said software lock with said first serial number.

9. The system of claim 8, further including means for reading said programmable fuses and storing a result in a memory unit.

10. The system of claim 9, wherein said memory unit is a machine specific register.

11. The system of claim 9, wherein said memory unit is a general purpose register.

* * * * *